June 28, 1966 J. H. STRADLING 3,258,164
BATCH WEIGH FEED APPARATUS
Filed Jan. 8, 1965 2 Sheets-Sheet 1

INVENTOR:
JOHN H. STRADLING
BY
Howson & Howson
ATTYS.

June 28, 1966  J. H. STRADLING  3,258,164
BATCH WEIGH FEED APPARATUS
Filed Jan. 8, 1965  2 Sheets-Sheet 2

INVENTOR:
JOHN H. STRADLING
BY Howson & Howson
ATTYS.

United States Patent Office 3,258,164
Patented June 28, 1966

3,258,164
BATCH WEIGH FEED APPARATUS
John H. Stradling, Cheltenham, Pa., assignor to Proctor & Schwartz, Inc., Philadelphia, Pa., a corporation of Pennsylvania
Filed Jan. 8, 1965, Ser. No. 424,283
7 Claims. (Cl. 222—56)

This invention relates to batch weigh feed apparatus, especially to apparatus for weighing and feeding fibers to fiber treating equipment, and has for an object the provision of improvements in this art.

There are many batch weighing machines in use in which material is fed down upon a weighing device having a weigh hopper with bottom or scale pan doors for holding material being fed until a predetermined weight is attained, after which the hopper doors are opened to discharge the material. Usually the feed supply means is stopped while a weighed batch is being dumped; and it is also customary to close a trap door above the weigh hopper to stop the feed of material thereto as soon as the weight has been made.

The weigh hopper takes up considerable vertical space and the opening and closing of the hopper doors and the actuation of door latches and the like requires considerable mechanism. Moreover, considerable time is required for operating this mechanism.

According to the present invention much space is saved, much mechanism is eliminated, and much time is saved by providing an open weigh sheet or plate, instead of a hopper, together with a simple push board or sweep which pushes the material off the weigh sheet after the weight has been made. The feed may be stopped and a trap door closed after the weight has been made, as before.

The weigh device may supply material to a delivery or take-off conveyor which runs continuously to carry the material to a receiving device which blends or otherwise treats it.

The push board or sweep may be activated in response to movement of the take-off mechanism, or in response to make-weight signals of the weighing mechanism, or in response to pure time signals, or other desired control means.

One of the particular objects of the invention is to provide batch weighing apparatus which takes little space vertically as compared to the usual hopper weighing apparatus.

Another object is to provide weighing apparatus which is simple in form and rapid in action.

Another object is to provide weighing apparatus with side delivery from a simple weigh sheet.

Another object is to provide weighing apparatus which is free from a weigh hopper, hopper doors, and door operating and holding mechanisms.

Another object is to provide weighing apparatus which is adaptable to manual or automatic feed regulation and adjustment.

Another object is to provide weighing apparatus which has low tare weight.

Another object is to provide weighing apparatus which is readily adaptable for use with like apparatus in blending lines.

Another object is to provide weighing apparatus which provides visual observation of the material as it is deposited on the weighing support.

Another object is to provide weighing apparatus which assures that the load removing element is clear of the weigh sheet before the deposit thereon of a batch of material can be started.

Another object is to provide weighing apparatus which is simple and relatively inexpensive and which can readily be assembled and serviced.

The above and other objects of the invention as well as various advantages and features of novelty will be apparent from the following description of an exemplary embodiment, reference being made to the accompanying drawings, wherein.

Figure 1:
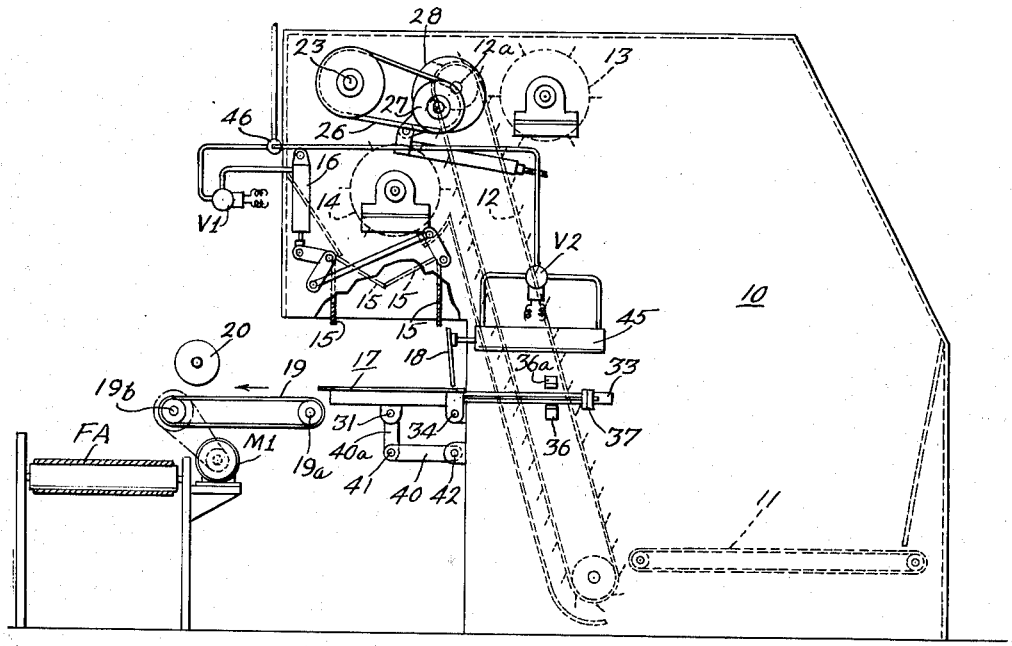
FIG. 1 is a side elevation, partly in section, of one form of apparatus embodying the invention.

Referring to the drawings, the batch feed unit illustrated comprises supply means, in the present instance a supply bin or hopper 10 having a horizontal bottom feed conveyor belt 11 for moving material, here assumed to be fiber stock, to a spiked carrier conveyor. In the present instance the spiked carrier conveyor comprises an inclined spike apron feed conveyor 12 which feeds the material upward. An evening doffer 13 is provided in the bin 10 near the upper end of the spike apron to remove lumps and fiber stock standing above a given height on the apron and return it to the bin. Fiber stock may be fed into the bin upon the bottom belt 11 by hand or by machine feed equipment.

The fiber stock left on the spike apron moves over the top turn with the apron and descends on the other side to be weighed and delivered. A take-off doffer 14 removes fiber stock from the downwardly moving spike apron and feeds it to the weighing mechanism therebelow.

The fiber stock removed from the spike apron falls down a chute which comprises side confining walls which may include gate means, in the present instance one or more trap door flap members 15, in the embodiment shown two being used, which can be swung up into the position shown in broken lines in FIG. 1, as by suitable linkage and a power motor device 16 and associated linkage to close off the chute after a predetermined weight of material has been fed down upon the batch weighing mechanism to be described. The trap door holds any material which may be fed down due to inertia or stoppage delay of the feeding mechanism. Such material as is caught on the trap doors is delivered at the start of the delivery of the next succeeding batch.

The material which is fed down falls upon a horizontal weigh sheet or plate 17 and is pushed therefrom by clear-off means, for example, a push board or sweep 18 upon a delivery device, such as a conveyor belt 19 carried by pulleys on shafts 19a, 19b. The conveyor belt is preferably driven continuously as by power motor M1 to deliver batches of weighed material to any suitable destination, as to a known transversely travelling floor aprong FA which also collects material from other batch weigh machines of a bank of such machines.

In some instances, for example, when the weigh feed apparatus is used in a blending line, the material may be delivered directly from the weigh sheet 17 to the floor apron FA.

Figure 5:
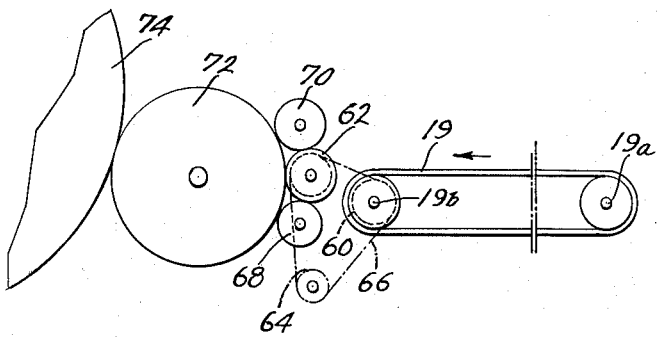
FIG. 5 is a partial view of another form of discharge means.

Further if desired, the material may be delivered by means of a delivery system of the type illustrated in FIG. 5 to an individual card, garnett or other processing equipment. In this system (FIG. 5) the conveyor 19 is driven from a sprocket on the bottom feed roll 62 by means of chain 66 which passes over idler sprocket 64 and sprocket 60 on shaft 19b. Bottom feed roll 62 is driven in customary manner integral with the card or garnett. The delivery system further includes a feed roll clearer 68, a top feed roll 70, a lickerin 72 and a main roll 74.

The delivery conveyors 19 or FA will be assumed to run at constant speed and can be used to drive timing cams for control switches which control the time cycle of the batch weigh apparatus. See, for example, the copending application of Edward M. Hyde, Serial No. 239,300, filed November 21, 1962, now Patent No. 3,212,673. The cycle may if desired, be controlled instead by a pure timing device; or the delivery cycle may be made wholly or primarily responsive to the make-weight signal of the weighing apparatus itself. In the apparatus herein illustrated a constantly rotating padder roll 20 aids the delivery of material by the conveyor belt 19.

Figure 2:
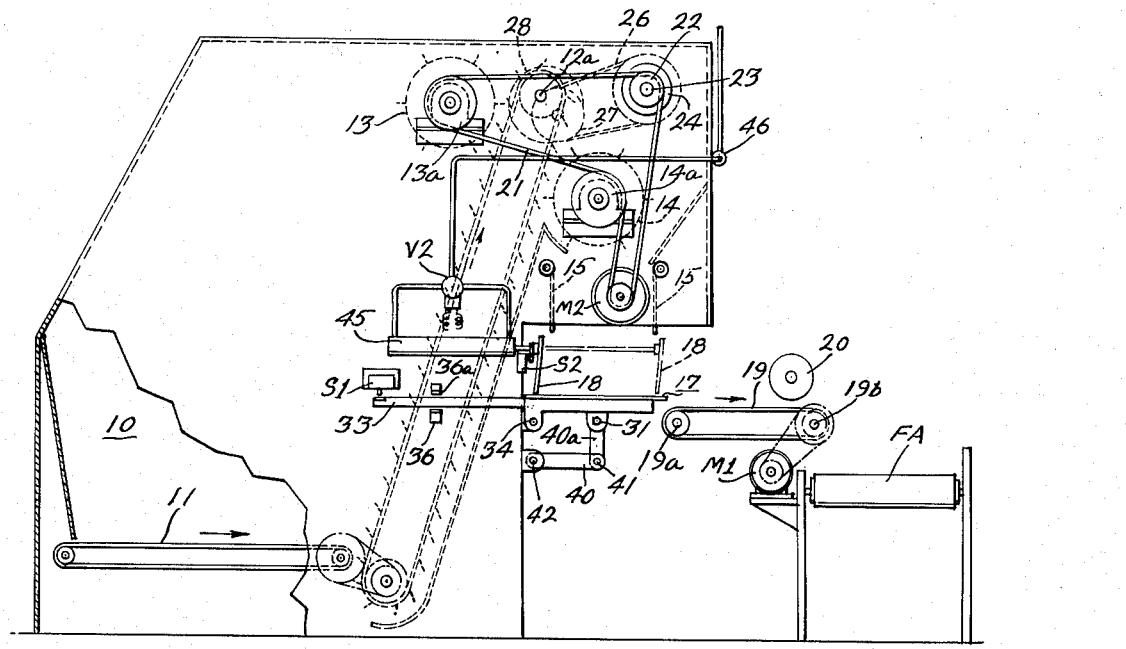
FIG. 2 is an elevation and section, similar to FIG. 1 but showing the other side.

As shown in FIG. 2, a motor M2 drives the spike apron 12 and the doffers 13 and 14. The bottom conveyor 11 is here shown to be connected with the drive of the spike apron and is also driven by the motor M2. It may be separately driven if desired. The motor M2 drives through a belt 21 which passes over a pulley 22 of a lay shaft 23, a pulley 13a of the shaft of the doffer 13, and over a pulley 14a of the shaft of the doffer 14.

In order to provide for starting and stopping the operation of the spike apron 12 for each batch of material provided, the lay shaft 23 is provided with an electro-magnetic clutch device 24 which connects the shaft 23 to or disconnects it from the continuously turning pulley 22, leaving only the doffers 13 and 14 to be operated continuously by the motor M2. This continuous drive could also be used to control the time cycle, but a material-receiving demand drive is preferable for the cycle control.

At its other end on the other side of the machine, as indicated in FIG. 1 and in broken lines in FIG. 2, the shaft 23, through a belt 26 and a variable speed drive mechanism 27 and related gearing 28 drives the upper shaft 12a of the spike apron 12. This speed changing mechanism, which here is of the Reeves type, as well as means for automatically adjusting the speed in accordance with the weighing and cycle control action are fully disclosed in the copending application referred to above; and, while the present weighing apparatus is well suited to use such feed adjusting means, it is not thought to be necessary to disclose it in detail herein.

As illustrated in FIGS. 1 and 2, the weigh sheet 17 has scale beams 33 projecting from one end thereof. The weigh sheet and scale beams are pivotally mounted to the machine frame by linkage means. In the present instance, the linkage means includes a pair of transversely extending shafts 34 and 42, each of which is journalled at opposite ends in bearings carried by the machine frame. The linkage further includes a link 40 pivotally connected at one end to the shaft 42 and pivotally connected as at 41 at its opposite end to a link 40a, the link 40a, as illustrated, being pivotally connected to the weigh sheet as at 31. The linkage defines a parallelogram arrangement permitting limited pivotal movement of the weigh sheet relative to the machine frame. Weight adjusting means 37 is provided for the beams 33 to selectively vary the quantity of material on the weigh sheet 17 to tilt the same downwardly. Stops 36 and 36a which as is illustrated are on opposite sides of the scale beams 33 are provided to limit pivotal movement of the scale beams. The stop means 36a is selectively positioned relative to the make-weight switch means S1 to permit engagement of the switch means by the scale beams when the weigh sheet pivots downwardly in response to a load of material thereon.

The push board or sweep 18 is operated by power motors 45, one at each end, controlled by suitable means. The motor shown is air operated from a line 46 for both motors and controlled by spring-return solenoid actuated valves V2 of known type.

A limit switch S2 is provided for the piston rod on one side to assure that the push board is in retracted position before the feed means can be operated, as will be described in connection with the wiring diagram.

Figure 4:
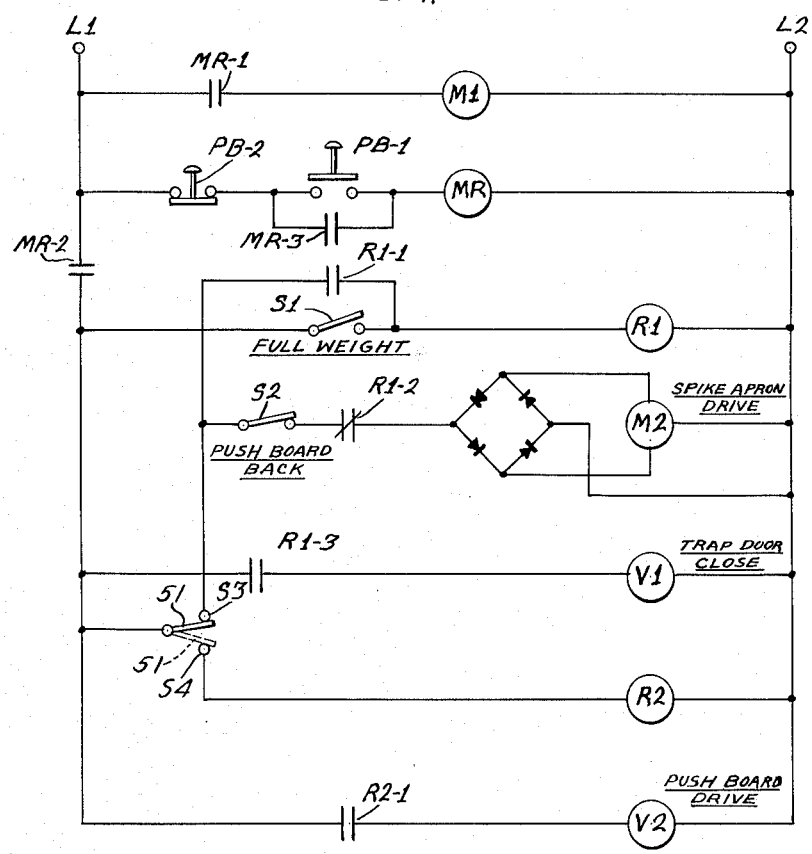
FIG. 4 is a wiring diagram.

The operation can be followed from the wiring diagram FIG. 4.

The continuously operating motor M1 for the conveyor belt 19 (or FA) is started by pressing start pushbutton PB–1 to energize the motor starter relay MR from power lines L1 and L2 and close MR–1. The relay locks in on MR–3 and can be deenergized at any time to stop the motor by pressing stop pushbutton PB–2. There will be overload and safety stop means for the motor, as is usual, but these need not be described.

Energization of relay MR also closes a line relay switch MR–2 to apply power to the control circuit shown below.

Figure 3:
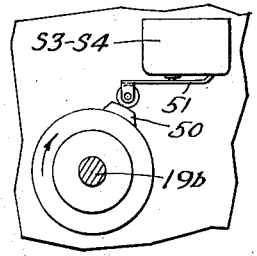
FIG. 3 is a partial enlarged view showing a timing switch and operating means therefor.

The feed motor clutch control 24 for motor M2 (shown as M2 in FIG. 4) is assumed to be energized to supply material to the weigh sheet 17 by the operation of the spike apron. A continuously turning cam 50 (FIG. 3) keeps the switch blade 51 closed to switch contact S3 for most of a cycle and shifts it to switch contact S4 (as shown in FIG. 3) for a short time at the end of each cycle. It is shown closed to S3 in FIG. 4. This is assuming that the cycle is given a constant time length instead of depending on make-weight time alone for control. In a constant time length cycle it is arranged that the weight will be made before the end of the cycle.

With S3 closed and the pushboard switch S2 closed (pushboard retracted) the spike apron will be running to feed down material to the weigh sheet 17. The trap door 15 will be open.

As soon as the weight is made, switch S1 closes to energize a relay (coil) R1. This relay locks itself in dependent on S3, on its lock-in contact switch R1–1. Energization of R1 also opens normally closed contact switch R1–2 to stop the operation of the spike apron drive by M2. It also closes its normally open contact switch R1–3 to actuate valve V1 of motor 16 to close the trap door 15.

At the end of a cycle switch S3 is opened and switch S4 is closed briefly. Closure of S4 energizes a relay R2 which closes its contact switch R2–1 to energize the valve V2 of power device 45 to move the pushboard 18 outward and sweep the material off the weigh sheet 17 and out upon the conveyor 19. The cam closes S4 only a short time to allow the pushboard to move out, after which it opens S4 and again closes S3.

Valve V2 immediately reverses to return the pushboard to retracted position. When the pushboard is retracted, its limit switch S2 is closed to allow the feed to resume. The trap door opens as soon as the load has been removed from the weigh sheet, R1–3 being opened when S1 re-opened to de-energize R1. When R1 is de-energized, it allows R1–2 to re-close so that the feed may be resumed as soon as S3 and S2 are closed.

It is thus seen that the invention provides very simple and economical batch weighing apparatus which conserves space and simplifies operations.

While one embodiment of the invention has been described for purposes of illustration, it is to be understood that there may be various embodiments and modifications within the scope of the invention.

I claim:

1. A batch feed apparatus comprising in combination: a casing having material supply means, a spiked carrier conveyor including drive means for effecting motion to said carrier, said spiked carrier conveyor operable to move material from said supply means; a take-off doffer for removing material from said carrier, and an evening doffer positioned intermediate said supply means and said take-off doffer, adjacent said carrier and spaced therefrom to level material on said carrier, at least said doffers and carrier positioned in said casing, a horizontal, open, weigh sheet positioned exteriorly of said casing to receive material from said take-off doffer; make-weight switch means connected to said weigh sheet and responsive to a predetermined load of material on said weigh sheet to interrupt the movement of said carrier drive means; weigh-sheet sweep means operable between an extended position, overlying said weigh sheet, and a retracted position to clear said weigh sheet of material thereon upon deactivation of said carrier drive means.

2. Batch weigh feed apparatus as set forth in claim 1, which further includes time controlled means for controlling the operation of said sweep means to push a batch of material from said weigh sheet.

3. Batch weigh feed apparatus as set forth in claim 1, which further includes a continuously operating material take-off device which receives material pushed off said weigh sheet by said sweep means, and means operated by said take-off device for controlling the operation of said sweep means to push a batch of material from said weigh sheet.

4. A batch feed apparatus in accordance with claim 1 including gate means positioned intermediate said take-off doffer and said weigh sheet, said gate means including actuator means operable upon actuation of said make-weight switch means to close off the path of said material between said doffer and said weigh sheet, said actuator means operable after said weigh sheet is cleared by said sweep means to open said gate means.

5. A batch feed apparatus in accordance with claim 1 wherein said spiked carrier conveyor comprises an inclined spike apron, and said doffers are cylindrical in cross section and mounted for rotation with respect to said apron.

6. A batch feed apparatus in accordance with claim 5 wherein said drive means for said apron includes a constant speed drive motor interconnecting said apron and said take-off doffer and evening doffer, and a clutch connected to said apron and electrically connected to said make-weight switch to clutch said conveyor into and out of operation without effecting the rotation of said take-off and evening doffers.

7. A batch feed apparatus in accordance with claim 6 including means responsive to the return of said sweep to its retracted position for reactivating said clutch for continued motion of said apron.

References Cited by the Examiner
UNITED STATES PATENTS

| | | | |
|---|---|---|---|
| 2,038,458 | 4/1936 | Von Segebaden et al. | 177—145 |
| 2,466,386 | 4/1949 | Curioni | 222—56 X |
| 2,967,703 | 1/1961 | Jones | 177—145 |
| 3,127,657 | 4/1964 | Benjey et al. | 222—55 X |

LOUIS J. DEMBO, *Primary Examiner.*

HADD S. LANE, *Examiner.*